United States Patent Office 3,353,980
Patented Nov. 21, 1967

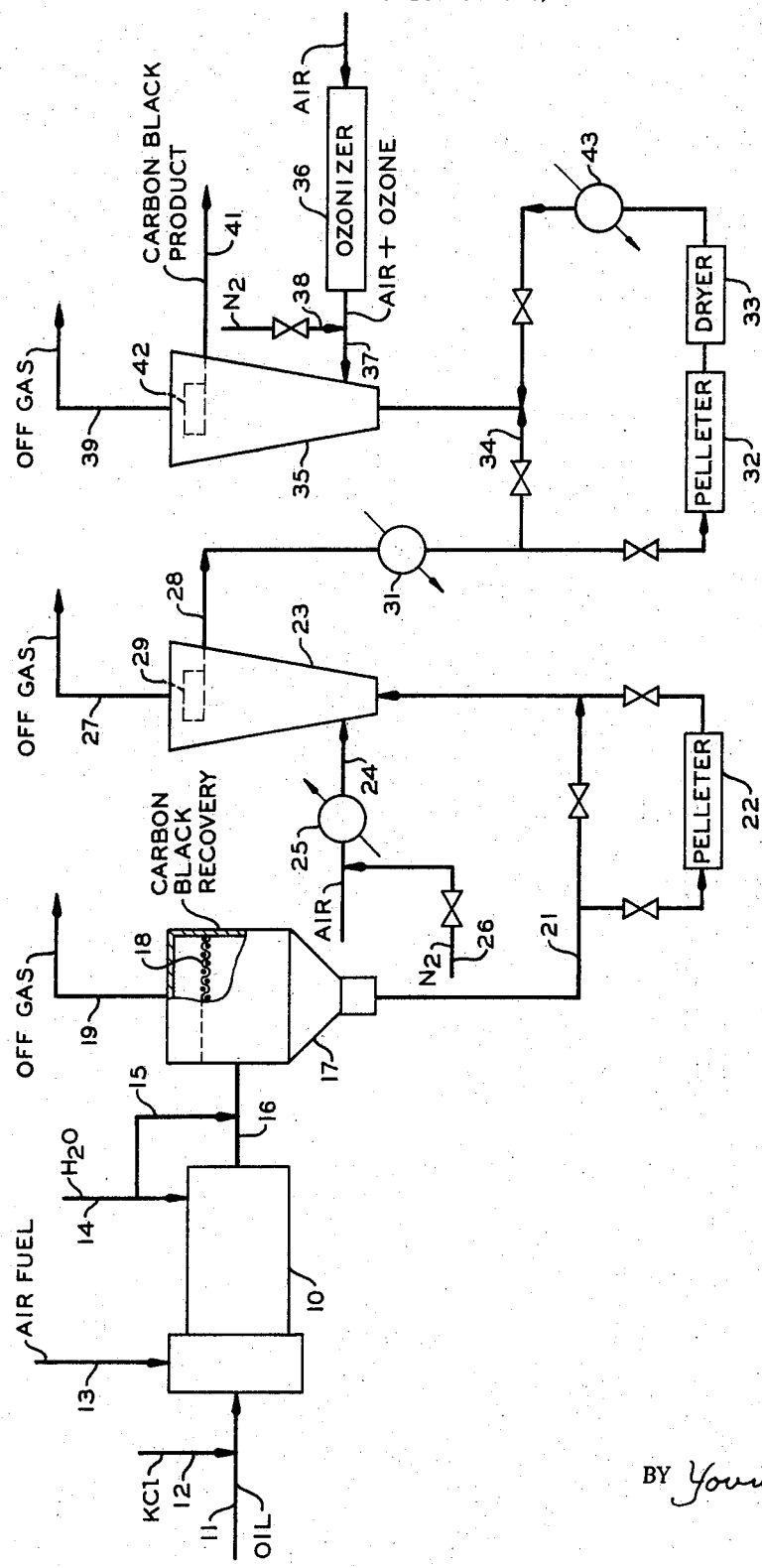

3,353,980
PROCESS OF MODIFYING FURNACE
CARBON BLACK
Paul H. Johnson, Bartlesville, Okla., assignor to Phillips
Petroleum Company, a corporation of Delaware
Filed June 8, 1964, Ser. No. 373,447
7 Claims. (Cl. 106—307)

This invention relates to a modified oil furnace carbon black and to a method for its production. This invention further relates to a simulated channel carbon black or an oil furnace carbon black which can be substituted for channel carbon black. In one aspect this invention relates to an oil furnace carbon black and a method for its production which can be substituted successfully for channel carbon black in the compounding of rubber. In another aspect the invention relates to an oil furnace carbon black which can be substituted for channel carbon black as a pigment, for example in the manufacture of ink. In still another aspect this invention relates to a method for producing oil furnace carbon black having lower than normal pH values, higher than normal surface area values, higher than normal percentage of volatile materials, and lower than normal values of oil absorption properties than those of conventional furnace carbon blacks of comparable grade.

In recent years carbon black has been produced in large quantities in carbon black producing furnaces using oil feed stock. Prior to the advent of the oil furnace carbon blacks, the major portion of the carbon black was produced by the channel process. The larger part of the carbon black produced today is used as a reinforcing agent for rubber. By far the larger part of the compounded rubber material containing carbon black is designed specifically for tire treads or tire carcasses.

Despite the widespread and increasing use of oil furnace blacks in applications formerly served by channel black, there are some uses for which channel blacks are still regarded as superior by some persons skilled in the art, for example, in tires for heavy duty off-the-road service and other specific applications. Some users prefer channel black because they have standardized on recipes originated with channel black and they do not choose to change the recipes to conform to those properties of furnace black which are different from the properties of channel black. It is therefore desirable to furnish the art with a furnace black exhibiting properties in rubber sufficiently comparable to those provided by channel black that the furnace black can be substituted for channel black in an existing rubber compounding recipe. This is particularly true because channel blacks are increasing in costs as a result of the increasing costs of the raw gas materials from which they are made and as a result of the inefficiency of the channel black process.

Broadly, the present invention contemplates the modification of furnace black to provide a substitute for channel black by treating a low structure furnace black with oxygen at high temperature and then with ozone at low temperature or with low temperature ozone treatment followed by high temperature oxygen treatment. This combined treatment provides a furnace black that can be substituted for channel black in a rubber compounding recipe.

It is an object of this invention to produce a furnace carbon black that can be satisfactorily substituted for channel black in a rubber compounding recipe. It is also an object of this invention to produce a furnace carbon black that is satisfactory for use as a pigment in the manufacture of ink. Still another object of this invention is to provide a method for modifying the properties of acidity and structure of a furnace black to simulate those of channel black. Yet another object of the invention is to provide a method for producing a furnace carbon black which, when compounded in rubber, will reduce the modulus property of the rubber and will increase the values of scorch time, volatile matter and oxygen in the compounded rubber as compared to a conventional oil furnace black. Other and further objects and advantages of this invention will be apparent to those skilled in the art upon reading this disclosure including the detailed description of the invention and the drawing wherein:

The sole figure of the drawing is a schematic flow diagram of a preferred embodiment of the process.

One channel carbon black which is particularly suitable as a reinforcing agent in rubber is generally designated as easy processing channel blacks (EPC). Oil furnace carbon blacks are inherently easy processing and therefore this property does not require modification in producing a channel black substitute. Channel blacks are generally characterized by a pH value below 7 and often about 3 or 4 whereas furnace blacks are characterized by a relatively higher pH value, often higher than 7, for example about 8 or 9. The lower pH value of the channel black is believed to be the result of acidic groups attached to or combined with the surface of the carbon black particle and this property is believed to impart a "built-in" vulcanization retarding agent which operates to prevent scorch or premature vulcanization of the rubber in which the carbon black is incorporated. It is therefore necessary to reduce the pH value or to increase the acidity of the oil furnace carbon black in order to simulate channel black. It is believed more accurate to say that it is necessary to attach some acidic groups to the furnace black particle to overcome the scorch tendencies of the furnace blacks. Measuring the pH of the treated oil furnace black is a simple and rapid method for estimating the amount of acidic groups attached to the furnace black particles. The amount of diphenylguanidine absorbed by the oil furnace black is another and more preferred method of measuring the acidic groups attached to the carbon black particles, e.g., an indication of the surface chemistry of the particles.

Another important property of furnace blacks in the compounding of rubber is the effect of the black on the modulus of the rubber. Furnace carbon blacks generally impart higher modulus values to the rubber in which these blacks are compounded than do channel blacks and therefore it is necessary to modify a furnace black that is to be used as a substitute for channel black to lower the modulus of the rubber in which the black is incorporated. There is a close correlation between the structure of a carbon black and the modulus of a rubber product compounded with such black and it has been found that carbon black produced in the presence of an alkali metal has lower than normal properties of structure and produces a rubber product having lower than normal modulus values. Since it is not convenient to measure the structure directly, the oil absorption properties of the black are commonly used as a measure of the structure of the black. It has been found that the oil absorption value of the carbon black usually correlates closely with the modulus of a rubber having the carbon black compounded therein. Alkali metals having an atomic number of at least 19 are particularly effective in lowering the structure property of furnace black and potassium is usually preferred because of its availability and beneficial effect. The alkali metal is added to the oil in an amount in the range of about 2 to 10,000 parts per million parts of oil by weight. An aqueous solution, e.g., an aqueous solution of KCl, is usually added to the oil prior to introduction of the oil to the carbon black furnace.

It has been proposed to attach acidic groups to a furnace carbon black by oxidizing the carbon black by treatment with oxygen or ozone. While treating with either oxygen (air) at a relatively high temperature or ozone at a relatively low temperature will increase the acidic nature of the furnace black, the resulting carbon black is not a satisfactory substitute for channel black because treatment of the oil furnace black with air at high temperature will not impart sufficient acidic groups to the black without an undesirable increase in surface area of the black or a prohibitive loss of carbon black due to the complete oxidation of black. Treatment of oil furnace black with ozone at high temperature, e.g., 300° F. and higher, is impractical because of the rapid decay of ozone at high temperature and because of the explosive nature of ozone at high temperature. Treatment of oil furnace black with ozone at low temperature is not entirely satisfactory because the volatile matter content of the carbon black is not appreciably increased and surface area is substantially unaffected by the ozone treatment.

I have found that the combined high temperature air treatment and low temperature ozone treatment will provide the oil furnace carbon black with the necessary properties for a channel black substitute, particularly when applied to a furnace black having lower than normal property of structure such as a furnace black made in the presence of an alkali metal.

I prefer to air treat first because this treatment can follow or be incorporated with the step of drying the pelleted black; however, the air treatment can follow the ozone treatment if such is desired. It is advisable to treat dry pellets with ozone because the presence of water is deleterious to treatment of black with ozone.

Referring now to the drawing, oil is charged to carbon black furnace 10 via conduit 11 and an alkali metal, for example an aqueous solution of potassium chloride, is introduced into the oil stream 11 via conduit 12 prior to introduction of the oil into the furnace 10. A mixture of fuel and air is introduced to the furnace 10 via conduit 13 and burned in the furnace to supply the heat for producing carbon black. The reaction is quenched by introduction of water via conduits 14 and 15 and the carbon black together with gases and steam are passed via conduit 16 to carbon black recovery system 17 where the carbon black is separated from the gases, for example by a filter mechanism indicated at 18, the gases are exhausted via conduit 19 and carbon black is removed via conduit 21. The carbon black can be pelleted in a pelleter 22 or can be passed directly via conduit 21 to treating vessel 23 wherein the loose carbon black or the carbon black pellets are contacted with air introduced via conduit 24 so that the carbon black is maintained as a fluidized bed in the treating vessel 23. The air is heated in heater 25 and the air can be diluted with nitrogen introduced via conduit 26 if it is desired to conduct the treatment with a lower concentration of oxygen in the treating gas. Off-gas is removed via conduit 27 and the carbon black is removed via conduit 28. A collecting pan 29 can be positioned in the treating vessel 23 into which the carbon black gravitates for removal from the vessel. The carbon black removed from vessel 23 is cooled in cooler 31 and passed to pelleter 32 and dryer 33, if treated as loose black in vessel 23, or passed directly via conduit 34 into treating vessel 35 if pelleted in pelleter 22. In vessel 35, which is a treating vessel similar to vessel 23, the carbon black is contacted with a stream of ozonized air obtained from ozonizer 36 and passed to vessel 35 via conduit 37. Nitrogen can be introduced into this stream via conduit 38 if it is desired to dilute the oxygen- and ozone-containing stream. Off-gas is removed via conduit 39 and carbon black product is recovered via conduit 41. The carbon black pellets in vessel 35 overflow into collecting pan 42 for removal from vessel 35. If loose carbon black is treated in treating vessel 23, pelleted in pelleter 32 and dried in dryer 33, it will usually be desirable to cool the pellets in cooler 43 prior to introduction to treating vessel 35.

The following example will be helpful in attaining an understanding of the invention but should not be construed as limiting the invention.

EXAMPLE

Properties of the carbon black samples of Table I are shown in Table II.

TABLE I.—CARBON BLACK SAMPLES (1) Furnace Carbon Black (HAF)
(2) Furnace Carbon Black (HAF) (130 p.p.m. KCl)
(3) No. 2 Black pelleted and ozonized, 1.7 lb. $O_3$/100 lb. Black at 100° F.
(4) No. 2 Black pelleted and air oxidized at 740° F., 1 hr.
(5) No. 4 Black ozonized, 1.65 lb. $O_3$/100 lb. Black at 100° F.
(6) Channel Black (EPC)

TABLE II.—CARBON BLACK PROPERTIES

|  | Black No. | | | | | |
| --- | --- | --- | --- | --- | --- | --- |
|  | 1 | 2 | 3 | 4 | 5 | 6 |
| pH | 6.7 | 7.3 | 2.7 | 5.1 | 3.4 | 4.0 |
| Surface Area, m.$^2$/g | 80 | 77 | 78 | 105 | 113 | 114 |
| Volatile, percent | 1.44 | 1.24 | 2.1 | 2.93 | 2.86 | 4.59 |
| Oil absorption, cc./g | 1.32 | 0.90 | 0.88 | 0.87 | 0.94 | 0.97 |
| DPG absorption, micro eq./g | 15.0 | 15.3 | 48 | 19.2 | 46.6 | 41.3 |

The same oil feed and furnace were utilized in preparing Blacks No. 1 and No. 2.

The properties of Black No. 5 compare very closely to those of Black No. 6, closely enough for substitution in a rubber compounding recipe. All of the properties of Black No. 3 are lower than desired except DPG absorption. The pH of Black No. 4 is higher than desired and the surface area, oil absorption and DPG absorption are slightly low.

Properties of rubber containing carbon black of the invention (Run 5) and channel black (Run 6) are shown in the following Table III. It can be observed that all of the properties are sufficiently similar so that the black of the invention can be substituted for channel black in a compounding recipe without changing the recipe.

TABLE III.—PROCESSING PROPERTIES (NATURAL RUBBER)

|  | Black No. | |
| --- | --- | --- |
|  | 5 | 6 |
| Compounded ML-4 at 212° F | 51.0 | 58.5 |
| Scorch at 250° F. (min. to 5 pt. rise) | 27.9 | 27.2 |
| Scorch at 280° F. (min. to 5 pt. rise) | 10.5 | 9.5 |
| Properties at 45 min., 293° F.: | | |
|    300% Modulus | 1,280 | 1,390 |
|    Tensile, p.s.i | 4,130 | 4,320 |
|    Elongation, percent | 610 | 605 |
|    Δ T, ° F | *32.1 | *31.6 |
|    Resilience, percent | *77.6 | *77.1 |
|    Shore A Hardness | 57.0 | 57.5 |
|    Crosslink Density, μ×10$^4$ mol./cc | 1.62 | 1.64 |
| 300% Modulus, 293° F., 30 min. cure | 1,300 | 1,350 |

*30 min. cure.

The recipe utilized in compounding the natural rubber batches tested is shown in Table IV.

TABLE VI.—NATURAL RUBBER RECIPE

| Ingredient: | Parts by weight per 100 parts smoked sheet |
| --- | --- |
| #1 smoked sheet | 100 |
| Carbon black | 45 |
| Zinc Oxide | 3 |
| Stearic Acid | 3 |
| Flexamine® | 1 |
| Flexzone 3 C® | 2 |
| Philrich 5® | 5 |
| Voltrol® | 1 |
| Sulfur | 2.25 |
| NOBS Special® | 0.7 |

In treating the carbon black according to the present invention it will usually be most convenient to treat the black with air and with ozonized air in a fluidized bed contacting device. Fluidized beds are well known and need not be further described here other than to state that the carbon black is fed into the bottom of a vessel and that air or ozonized air is then introduced into the bottom of the vessel at a rate sufficient to lift the bed slightly so that the bed of particles is suspended and in motion that simulates the action of a boiling liquid. Treated black is removed from the top of the bed and off-gas is removed from the top of the vessel. A cyclone separator can be employed in the space between the fluidized bed and the top of the vessel if desired to remove solid particles from the off-gas stream and return them to the fluidized bed. It will usually be found more satisfactory to treat pelleted carbon black because the pelleted black is more amenable to the fluidized bed technique than is the loose black; however, it is possible to maintain the loose black by the fluidized bed technique, particularly if a cyclone separator is utilized to prevent entrainment of carbon black.

If the carbon black is pelleted by the wet pelleting process, it will be advantageous to conduct the high temperature air treatment as the first treating step because the high temperature air oxidation step can be combined with the pellet drying step. If the ozone treatment, e.g., ozonized air, precedes the high temperature air treatment, it will be necessary to dry the pellets prior to the treating step to avoid the deleterious effects of water on the ozone treatment.

The air oxidation step will be conducted at a temperature in the range of about 450° F. to 1000° F. and the reaction time will be sufficient to lower the pH to a value below 6 or to adjust the DPG absorption value to about 15 to 20 microequivalents per gram and to increase the volatile content of the black to a value between about 2.5 and 3.5 percent but not sufficient to increase the surface area to more than about 120 square meters per gram. These values will usually be attained most efficiently and quickly when the air treating step is effected at a temperature in the range of about 600 to 1000° F. It may be desirable to dilute the treating air with nitrogen at the high treating temperatures, for example 900 to 1000° F. Oxygen enriched air can be used at temperatures in the range 450 to 550° F. The oxygen content of the air can be as high as about 50 percent. The air treating time will usually be in the range of about 30 minutes to 4 hours; however, the treating time will be dependent upon air temperature, oxygen content of the air, rate of air flow, initial pH of the black, pellet size and other such variables.

The air oxidized black is then cooled to a temperature below about 200° F. and is then treated with air containing from about 0.3 to 3.0 percent ozone until the pH is further lowered to a value in the range of about 3 to 5 or until the DPG absorption value is about 40 to 50 microequivalents per gram. This will usually require about 1 to 5 pounds of ozone per 100 pounds of black and the treating temperature will usually be about ambient temperature to about 300° F. The ozone treating time will usually be similar to that of air treating and will be dependent upon temperature, concentration of ozone in the air, the pH of the starting black and other variables.

The carbon black of this invention has an intense black color, is substantially free from tars and is particularly suitable for use in inks and pigments in addition to its utility in compounded rubber.

That which is claimed is:

1. A process for preparing a treated furnace carbon black having properties comparable to those of channel process carbon black which comprises thermally decomposing a hydrocarbon in a carbon black furnace under conditions of free carbon formation in the presence of from 2 to 10,000 parts by weight per million parts by weight of carbon black produced of an alkali metal having an atomic number of at least 19; pelleting the carbon black; partially oxidizing the pelleted carbon black so produced with an oxygen-containing gas stream at a temperature in the range of about 600 to 1000° F. until DPG absorption values for the black are in the range of about 15 to 20 microequivalents per gram; cooling the black to a temperature between about 100 and 300° F.; and partially oxidizing the black with an ozone-containing gas until the DPG absorption value of the black is in the range of about 40 to 50 microequivalents per gram.

2. A process for preparing a furnace carbon black having properties comparable to those of channel carbon black which comprises thermally decomposing a hydrocarbon in a carbon black furnace in the presence of an alkali metal having an atomic number of at least 19; partially oxidizing the carbon black so produced with an oxygen-containing gas stream at a temperature in the range of about 450 to 1000° F.; cooling the carbon black to a temperature between about 100 and 300° F.; and further oxidizing the black with an ozone-containing gas.

3. The process of claim 2 wherein the carbon black is wet pelleted and dried prior to the ozone treatment.

4. The process of claim 2 wherein the carbon black is dry pelleted subsequent to the ozone treatment.

5. A process for preparing a furnace carbon black having properties comparable to those of channel carbon black which comprises thermally decomposing a hydrocarbon in a carbon black furnace under conditions of free carbon formation in the presence of from about 2 to 10,000 parts by weight per million parts by weight of carbon black produced of an alkali metal having an atomic number of at least 19; pelleting the carbon black so as to produce substantially dry carbon black pellets; partially oxidizing the pelleted carbon black so produced with an ozone-containing gas at a temperature between about 100 and 300° F. until the DPG absorption value of the black is in the range of about 40 to 65 microequivalents per gram; and further oxidizing the ozone-treated carbon black pellets with an oxygen-containing gas stream at a temperature in the range of about 600 to 1000° F. until the surface area of the carbon black is increased to not more than about 120 square meters per gram and the volatile content of the black is between about 2.5 and 3.5 percent.

6. The process of claim 5 wherein the oxygen-containing gas is air and the ozone-containing gas is air containing about 0.3 to 3.0 weight percent ozone.

7. A process for preparing a furnace carbon black having properties comparable to those of channel carbon black which comprises thermally decomposing a hydrocarbon in a carbon black furnace in the presence of an alkali metal having an atomic number of at least 19; partially oxidizing the carbon black so produced with an ozone containing gas at a temperature in the range of about 100 to 300° F.; and further oxidizing the black with an oxygen containing gas at a temperature in the range of about 450–1000° F.

References Cited

UNITED STATES PATENTS

| | | | |
|---|---|---|---|
| 2,641,535 | 6/1953 | Cines | 106—307 |
| 2,682,448 | 6/1954 | Cines | 23—209.1 |
| 2,714,055 | 7/1955 | Cines et al. | 23—209.4 |
| 3,010,794 | 11/1961 | Friauf et al. | 23—209.4 |
| 3,216,843 | 11/1965 | Heller et al. | 23—209.1 |
| 3,247,003 | 4/1966 | Pollock | 106—307 |
| 3,306,761 | 2/1967 | Johnson | 106—307 |

TOBIAS E. LEVOW, *Primary Examiner.*

S. E. MOTT, *Assistant Examiner.*